United States Patent [19]

Geddes

[11] Patent Number: 5,555,825
[45] Date of Patent: Sep. 17, 1996

[54] DIRECT DRILL STUMP JUMP SEEDER

[76] Inventor: Ian Geddes, P.O. Box 82, Lake Bolac, Victoria 3351, Australia

[21] Appl. No.: 852,202
[22] PCT Filed: Sep. 17, 1990
[86] PCT No.: PCT/AU90/00427
  § 371 Date: Jul. 15, 1992
  § 102(e) Date: Jul. 15, 1992
[87] PCT Pub. No.: WO91/07079
  PCT Pub. Date: May 30, 1991

[30] Foreign Application Priority Data

Nov. 17, 1989 [AU] Australia ................... PJ7464

[51] Int. Cl.⁶ ................................. A01C 5/06
[52] U.S. Cl. ............... 111/69; 111/62; 172/264; 172/551; 172/462
[58] Field of Search ............... 111/69, 62, 134, 111/135, 151, 926, 149; 172/264, 265, 551, 462

[56] References Cited

U.S. PATENT DOCUMENTS

| | | | |
|---|---|---|---|
| 3,090,333 | 5/1963 | Caha | 111/63 |
| 3,237,702 | 3/1966 | Orendorff | 172/705 |
| 3,797,418 | 3/1974 | Bridger, Jr. | 111/73 |
| 4,311,104 | 1/1982 | Steilen et al. | 111/85 |
| 4,432,292 | 2/1984 | Scott | 111/62 |
| 4,846,084 | 7/1989 | Sigle | 111/926 |

FOREIGN PATENT DOCUMENTS

| | | |
|---|---|---|
| 69703/74 | 12/1975 | Australia . |
| 11112/83 | 9/1983 | Australia . |
| 47386/85 | 3/1986 | Australia . |
| 58706/86 | 12/1986 | Australia . |
| 14555785 | 11/1976 | United Kingdom ............ 111/134 |

Primary Examiner—Michael A. Neas
Attorney, Agent, or Firm—Christensen O'Connor Johnson & Kindness PLLC

[57] ABSTRACT

A direct drill seeding unit comprising a coulter wheel (5), a pair of depth control wheels (7) and a splitter (9) where the main components of the seeding unit are pivoted on an elongate arm (1) which is connected to a common or main frame (3). The pivotal movement of the unit allows a gang of the seeding units to follow undulating land in a very faithful manner. Furthermore the splitter (9) is capable of variable height and angle relative to the ground level according to the vertical position of the elongate arm such that as the arm moves up the splitter shall automatically compensate by lowering in order to maintain contact with the soil. The adjustment of the splitter is effected by the trapezoid configuration of the 4 pivoting points and the "L" shaped common linkages (4).

17 Claims, 6 Drawing Sheets

DIRECT DRILL STUMP JUMP SEEDER

FIELD OF THE INVENTION

This invention relates to direct drill stump jump seeders.

BACKGROUND OF THE INVENTION

Traditional methods of working and preparing the soil have in recent times, come under close scrutiny. The efficient and environmentally responsible utilization of the soil is becoming an ever increasing concern to the primary producer both in the short term production result and also in the long term environmental impact result.

Seeding is a fundamental soil treatment where seeds and/or fertilizer are introduced into the top layers of soil. In order to efficiently execute this operation with minimum damage to the soil, a number of seeding devices have been produced.

Seeders are known in which the seed and/or fertiliser are conveyed to seeder tynes and which place the seed and fertiliser into the ground.

Because of the cost of fuel and changing farming techniques which are taking place in agriculture, new and more specialized tillage implements are required to achieve the desired planting results and efficiency of operation.

One form of farming that has come into favour in recent years incorporates "Direct Drilling" wherein The desired sowing result in conjunction with optional herbicidal applications is achieved directly into existing pastures without any form of physical preparation or cultivation. Traditional farming and fallow techniques typically employ a plough or form of ripper followed by numerous passes with one or other varieties of cultivation implements in order to break down the composition of the soil sufficiently to provide adequate trash flow (through the seeder) and a suitable seed bed for seed/soil contact. Furthermore, a weedkill can occur due to the dramatic loss of moisture in the top layer of cultivated soil. The traditional techniques of soil treatment, whilst adequate for sowing and involving other advantages, are on the whole an expensive and time consuming method of sowing with many disadvantages including the inability to accurately sow directly into the soil.

Direct drilling is therefore a concept which avoids excessive cultivation of often overworked or fragile soils thus preserving or improving soil structure. Further savings occur in fuel consumption, time and labour costs. To date, however, the technology required for this type of drilling involves purpose built machines having specific applications and are invariably expensive and inflexible.

Furthermore, one particular range of tillage implements manufactured for direct drilling involve a commonality of design wherein the seeding unit comprises a coulter wheel, tyne and seeder tube which are all located from a common point such that all the components of the seeding unit engage the contour of the ground in a rigid and inflexible manner. As the seeding unit is drawn through the soil the coulter cuts a furrow in the soil invariably constant relative to frame with tyne and seeding tube located behind the coulter. In this arrangement, the coulter wheel produces the primary furrow which is then engaged by the tyne and sowing boot which injects seed or fertilizer into the furrow. Compactor wheels or cover harrows may follow the tyne in order to close and consolidate the furrow after the seed has been injected.

SUMMARY OF THE INVENTION

In the development of the instant invention it became clear that a different arrangement of coulter, splitter-tyne and depth control was required to ensure uniformity of seed sowing depth in uneven ground contours under direct drilling in order to overcome the problems of trash blockage. Clearly, the coulter was necessary to first cut a furrow and hence must be positioned forward of the splitter and seeder tube. The usual position of the depth wheel behind the splitter and seed tube on each side thereof appeared to be the principle cause of clogging and/or inaccurate sowing depths, repositioning of this wheel appeared necessary. However, any positioning of the depth wheel forward of the splitter and seed tube introduces a moment of rotation about the wheel such that when the seeding unit strikes undulating ground, the splitter and seed tube following the wheel shall either lift out of the furrow or dig in as the unit follows the undulations of the ground. Further development of the invention provided the splitter and seed tube with automatically adjustable height to counteract the moment of rotation as the seeding unit travelled over undulating ground, such that as the depth wheel was raised over a high piece of ground, the splitter and seed tube would automatically lower to ensure that they remained in the ground, or if the depth wheel moved into a low piece of ground, the splitter and seed tube would automatically raise up to avoid digging into the ground.

Another deficiency of prior art seeders addressed by a particularly preferred form of the instant invention is the problem of coulter disc flex which occurs when the seeder is turning corners. To date, the seeding units have not only been rigidly connected to the main frame in a vertical plane but also rigidly connected in a horizontal plane. Therefore, as the main frame is turned around a corner a severe strain is placed on the coulter as it effectively pulls sideways through the soil. A further improvement of the instant invention may optionally involve the provision for horizontal movement of the seeding units by a hinge or other pivoting means to the common frame.

Accordingly the invention provides a direct drill seeding unit comprising a contour wheel operatively connected to and positioned forward of a splitter such that any vertical movement of said contour wheel relative to mean ground level causes a counter-acting movement of said splitter so as to maintain said splitter at a substantially constant depth and angle of entry relative to actual ground level.

Preferably the operative connection effecting the counter-acting movement of the splitter is by mechanical means.

Preferably the mechanical means comprises a first and second elongate member pivotally connected at a first end to a common frame to accommodate vertical displacement and pivotally connected at the second end to a hinged crank to form a trapezoid configuration such that the relative movement of said hinged crank effects the counteracting movement of the splitter.

Preferably the seeding unit is pivotally attached to the common frame to allow horizontal movement of the seeding unit.

Preferably the first elongate member has attached thereto said contour wheel adapted to follow the contour of the ground.

Preferably the splitter is slidably connected to the first elongate member at an extension of said second end and pivotally connected to an overhang of said pivoted crank corresponding to said extension.

Preferably the splitter incorporates a seeding tube.

Preferably the splitter incorporates a spreading bar wedge.

Preferably the seeding unit can be lowered and raised relative to the common frame.

Preferably the second elongate member can be shortened to facilitate raising of the seeding unit beyond the normal limits of adjustment of the splitter.

Preferably the second elongate member is capable of compliant compression.

Preferably the second elongate member is resiliently telescopic.

Preferably the resilience has a coefficient of compression able to resist the normal action of the furrow against the splitter but shall allow the splitter to retract if an obstacle is struck.

Preferably the seeding units are lowered and raised by hydraulic means.

The invention further provides a direct drill seeder comprising a number of independently controlled seeding units.

Preferably the seeding units are spaced transversely in a frame adapted for pulling.

Preferably the said seeding units are independently activated by a single acting hydraulic ram such that the requisite downward thrust can be applied independently to the separate seeding units and/or any combination of the said seeding units may by independently raised into the main frame out of contact with the ground.

More preferably the seeding units are activated by a double acting hydraulic ram.

The main frame can accommodate a multitude of seeding unit rows in stepped array.

The hydraulic rams may be activated by independent circuits which are in turn controlled by a hydraulic switching system to allow the co-ordinated control of the seeding units such that, for example, the co-ordinated control of the seeding units allows the seeder to act as a variable row seeder by lowering of the desired combination of tynes.

Preferably the variable rows are 3", 6", 9" and 12" sowing rows or any combination thereof.

Preferably the hydraulic rams are all connected to a common circuit via a master cylinder and a damper spring in order to achieve a desired pressure in the common circuit.

Preferably the co-ordinated control hydraulic switching system incorporates an in-line splitter box which isolates any desired tyne or tynes in the raised position while shutting off the respective seed/fertiliser source.

Preferably the seeding units may be arranged into modulettes wherein each modulette incorporates a multitude of seeding units in stepped arrangement.

BRIEF DESCRIPTION OF THE DRAWINGS

A particularly preferred form of the invention will now be described with reference to the drawings where.

DETAILED DESCRIPTION OF THE PREFERRED EMBODIMENT

Figure 1:
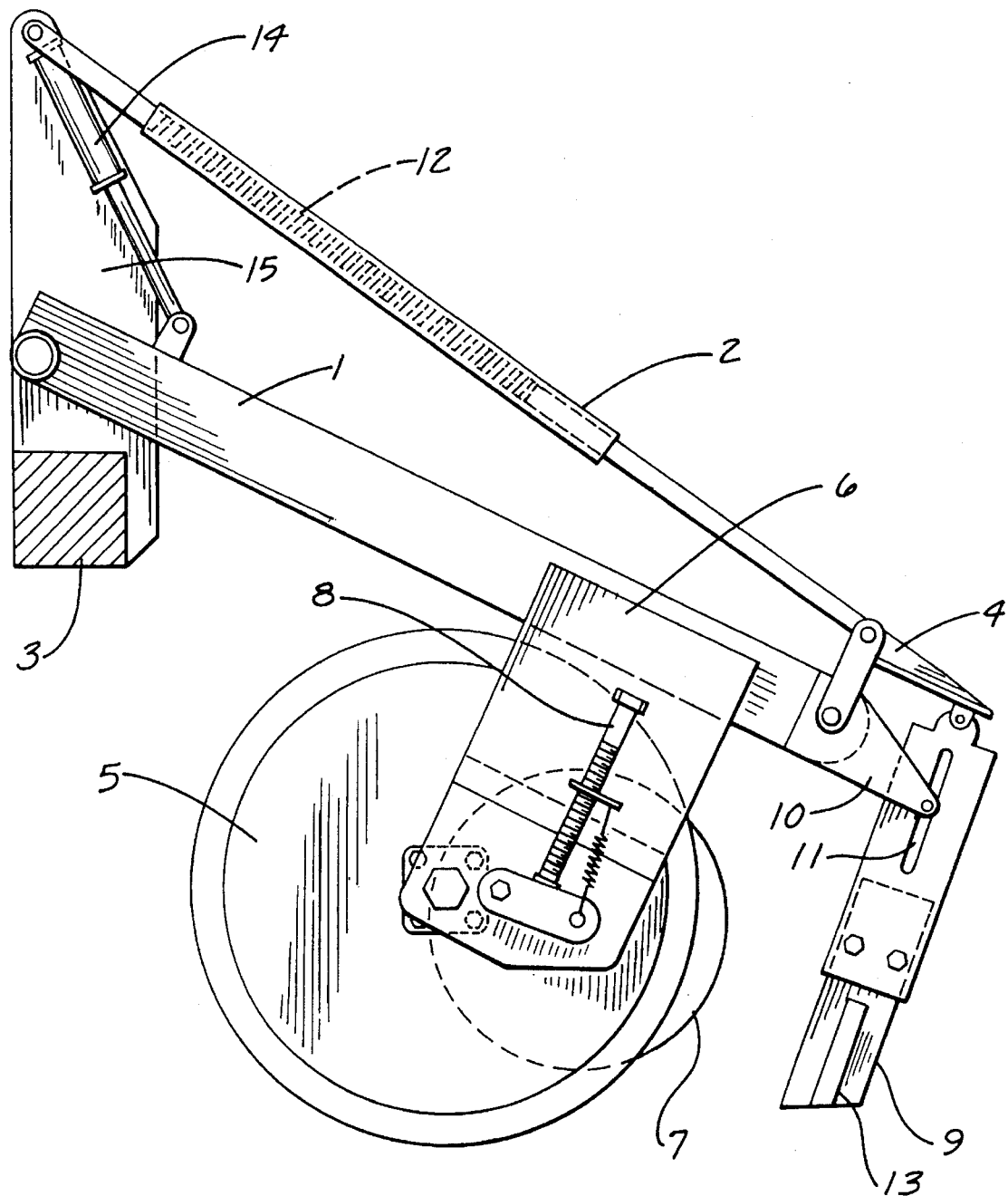
FIG. 1 is a side elevation of one individual seeding unit.
Figure 2:
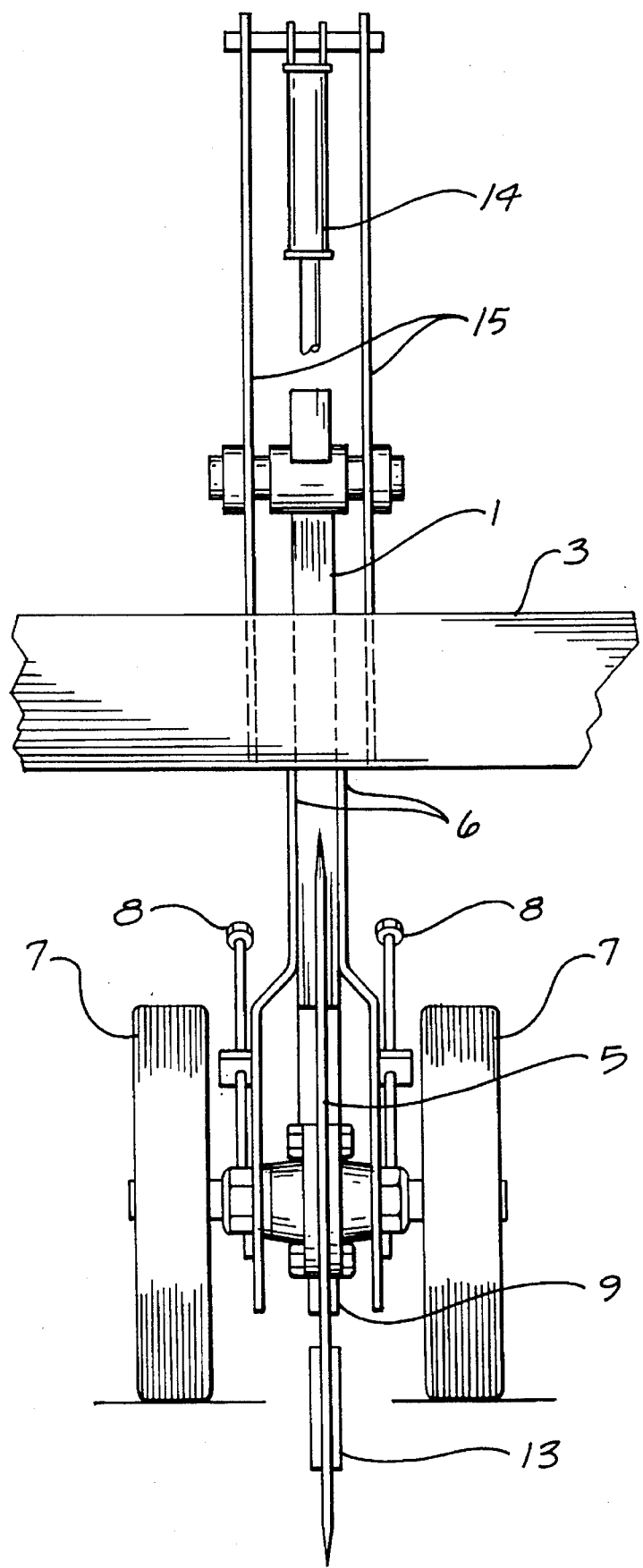
FIG. 2 is a front elevation of one seeding unit.

The seeding unit comprises elongate members 1, 2 pivotally connected at a mainframe 3 and a hinged crank 4 such that the four pivoting points provide a trapezoid configuration. The coulter wheel 5 is attached directly to the first elongate member 1 via plates 6, with depth controlling wheels 7 also attached to the plates 6 via a depth control mechanism 8 such that the seeding unit is made to follow the contours of the ground by pivoting up and down relative to the main frame 3 as the depth wheel follows the contours of the ground, with the coulter wheel 5 cutting a furrow of predetermined depth. The splitter 9 is slidably engaged to an extension of the first elongate member 10 via a slot 11 whilst being pivotally attached to the overhang section of the hinged crank 4 such that any vertical movement of the depth wheel 7 and coulter 5 caused by undulating ground shall cause the splitter 9 to counteract.

For example, when the depth wheels reach a high contour, the tyne will begin to lift up relative to the main frame. The upward motion shall directly cause the coulter to lift and hence maintain the predetermined depth of cut for the coulter. As the depth wheel and coulter begin to lift, both the elongate members 1 and 2 shall also lift and pivot upwards. However, as the two elongate members are of different length, the upward movement shall cause the hinged crank 4 to tilt over and hence lower the splitter 9. The overall effect of the counteraction of the splitter is to avoid the splitter lifting out of the ground as it otherwise would. Conversely, in the event of the unit reaching a low contour, the reverse happens and the splitter is lifted up to prevent it digging into the ground hence maintaining constant accurate sowing depth.

Figure 4:
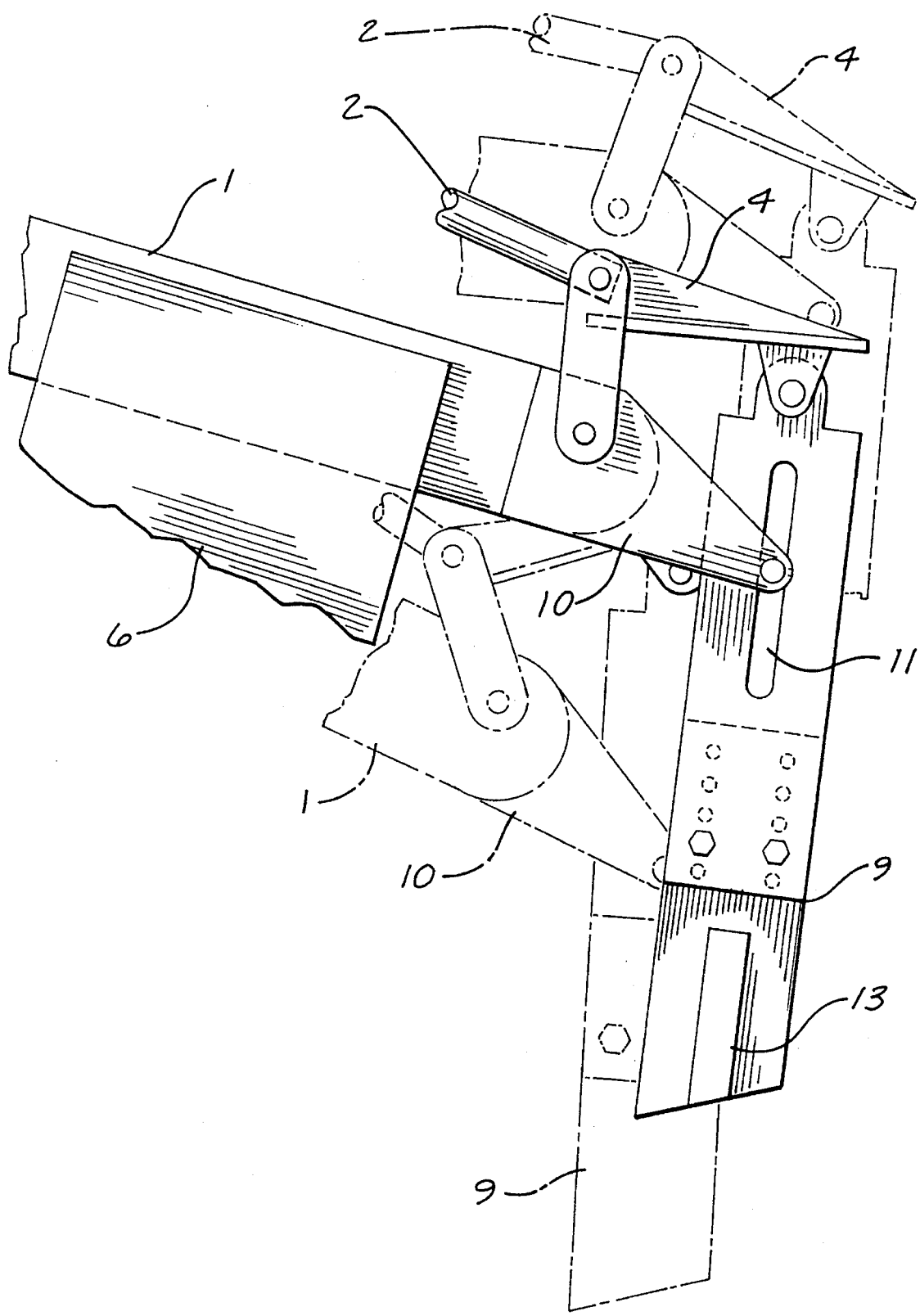
FIGS. 4 and 4a–c are a representation of the relative movements of the splitter over the full adjustment span of the seeding unit.

FIG. 4 provides a detailed embodiment of the full operational range of the splitter shown in three positions.

Figure 4C:
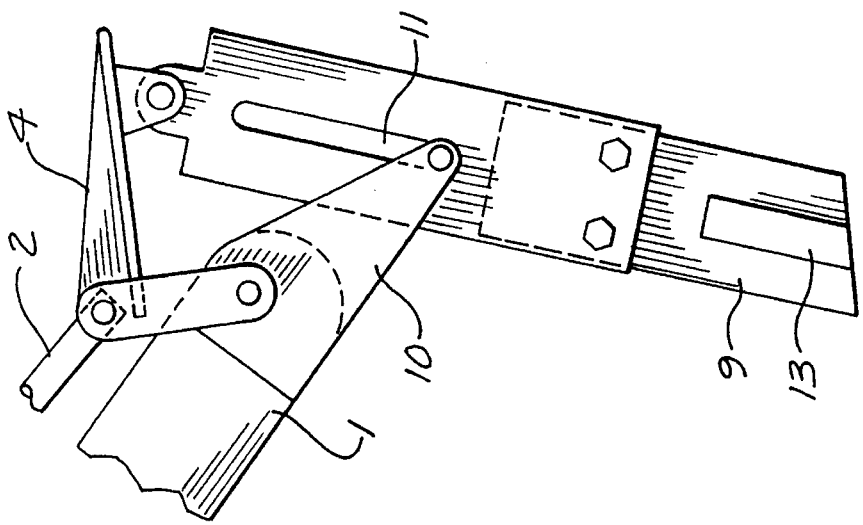

In the fully raised position (see FIG. 4a), which would correspond to the unit traversing a high piece of ground, the trapezoid configuration of the two elongate members 1 and 2 has tilted the hinged crank 4 fully forward and effected the complete lowering of the splitter.

Conversely, in the fully lowered position (see FIG. 4c) which would correspond to the unit traversing a low piece of ground, the trapezoid configuration of the elongate members shall tilt the hinged crank back and effect the raising of the splitter.

Figure 4B:
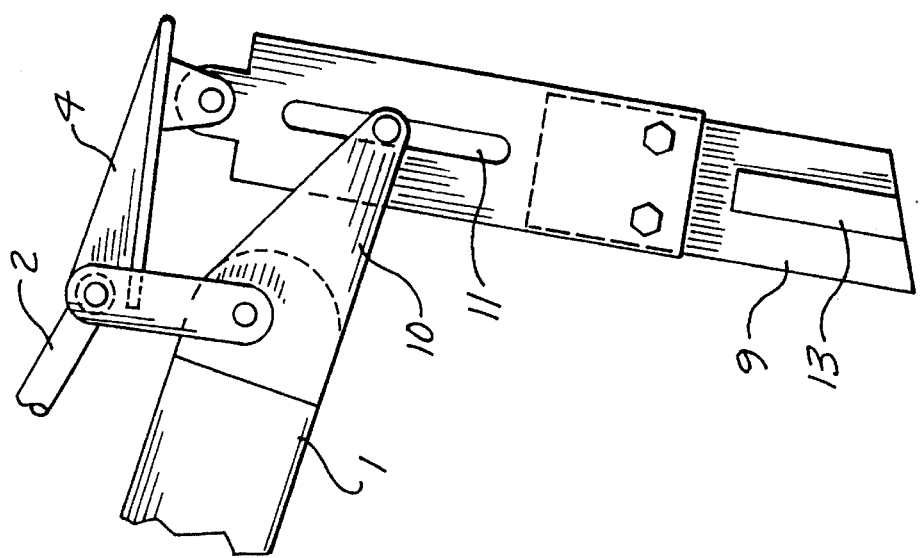
Figure 4A:
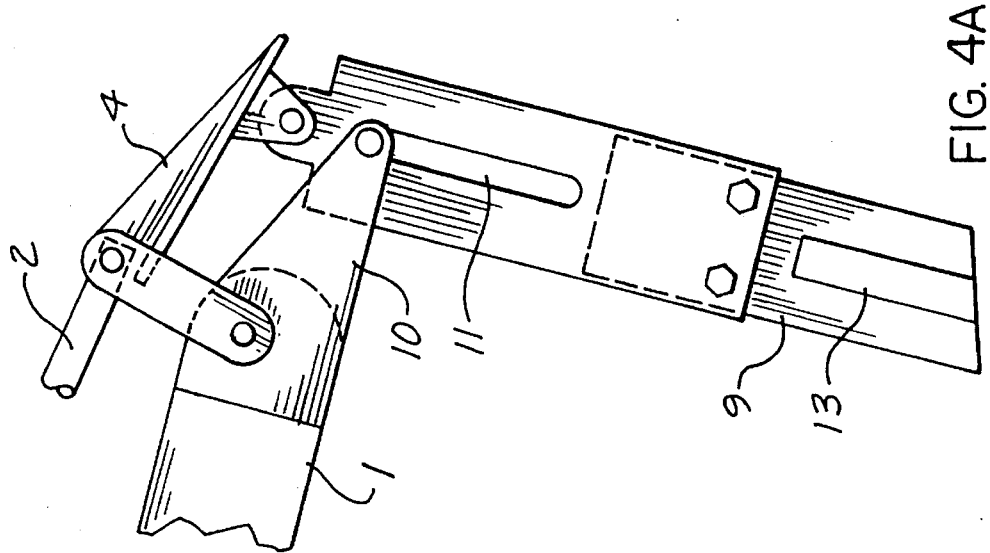

The intermediate height is detailed in FIG. 4b, corresponding to "mean ground level" and predetermined "mean operative frame" height.

In addition to the raising and lowering of the splitter a further motion is provided by the pivoting action of the common linkage through the range of the slot in that the splitter angle of entry into the ground automatically adjusts in order to maintain a fixed angle of entry into the ground irrespective of the change in ground slope throughout changes in contour.

As can be seen from the foregoing description, the instant invention provides a unique seeding unit free of the problems of clotting and blocking previously caused by small trash clearance and rigid tyne construction. Furthermore, the arrangement of the splitter to follow the coulter and depth wheel, although functional in its own right, lead to further improvements in the automatic adjustment mechanism of the splitter with the combined arrangement of an adjustable splitter following a coulter and depth wheel with an enhanced trash clearance giving a greatly improved seeding unit requiring less power to drive and offering great versatility in application.

The seeding unit is particularly well adapted when used in multiple rows in a single main frame such that a multiplicity of seeding units can be assembled across a main frame in staggered rows. When so assembled, the individual units can be independently raised out of the ground and lowered back down by the hydraulic rams 14 to assist in maximising terrain coverage and also to facilitate resistance to interference by obstacles whence the jammed seeding unit may be independently raised to clear the obstacle.

Figure 3:
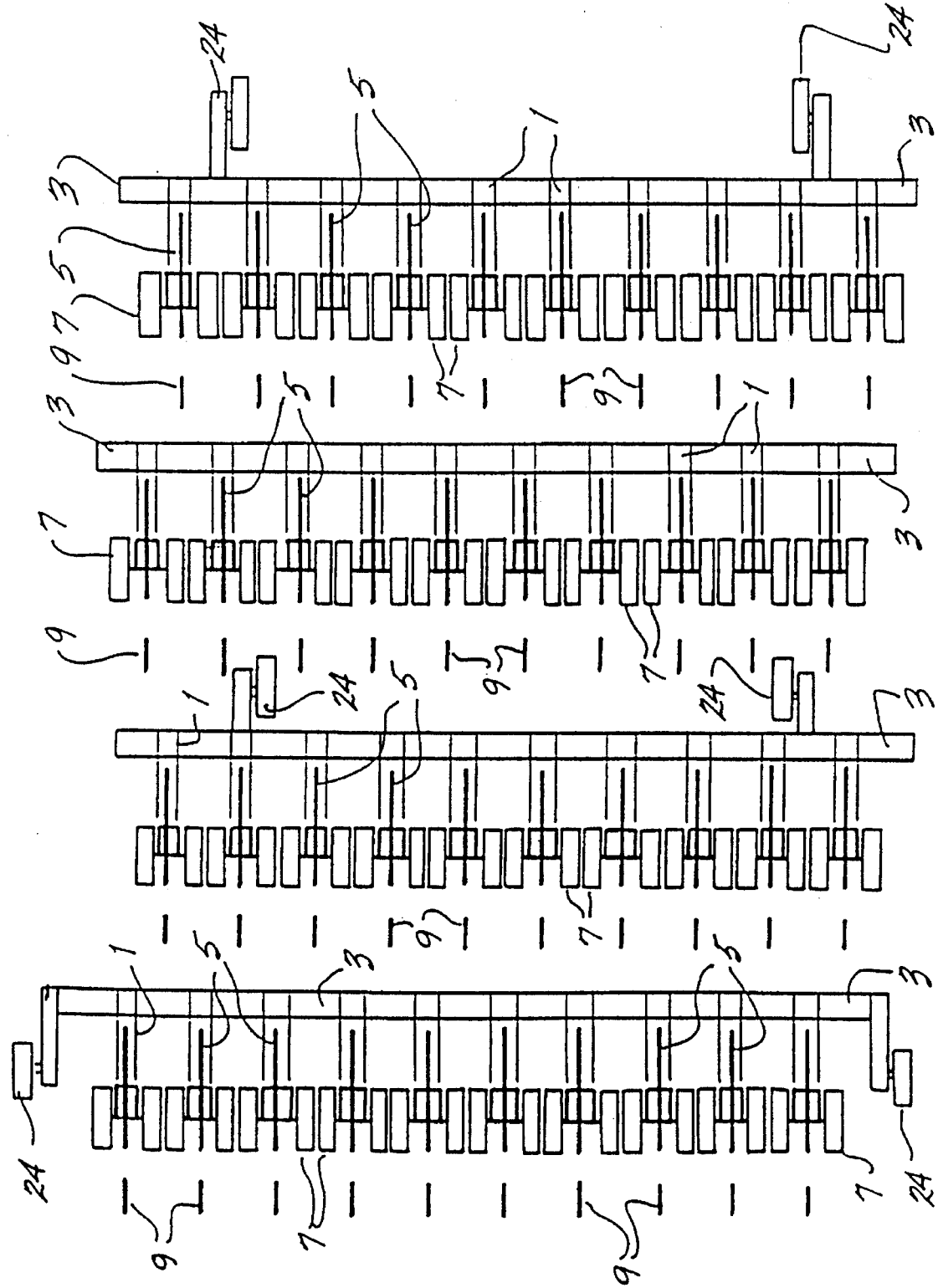
FIG. 3 is a schematic representation of the plan layout of a number of seeding units assembled onto a main frame.

FIG. 3 shows a particularly preferred arrangement of seeding units in a main frame stump jump seeder.

The main frame 3 supports a multitude of seeding units 1 and is constructed so that a number of frames 3 can be assembled together to construct a seeder comprising as many units as required. The seeder has wheels 14 which give the overall height control for the seeder.

In order to facilitate the raising of the seeding unit out of the ground, the second elongate member must be capable of shortening as the trapezoid mechanism only allows a limited range of movement of the seeder before the maximum lowering of the splitter is reached.

In order to facilitate such an operation, the second elongate member may be capable of telescopic action against the compression of a spring 12. The coefficient of compression of the spring 12 must be high enough to resist the normal action of the splitter as it passes through the ground, however, if the splitter strikes a rock or other obstacle, it may raise itself against the compression of the spring rather than causing damage to the seeding unit or stopping the whole machine.

Each seeding unit possesses its own double or single acting hydraulic ram connected to a circuit common to each and every seeding unit and its ram via a master cylinder. In turn the desired pressure in the common circuit is achieved and maintained by the utilisation of a damper spring attached to one end of the master ram (cylinder).

In the case of double acting rams, the ram is capable of raising or lowering the seeding unit. Where a single acting ram is used, the ram is used to lower the unit and keep it in contact with the ground. When the seed unit is raised by hand it can then be fixed in the raised position by a pin inserted through the elongate member 1 and the gusset 15.

This dual purpose system creates the downward force necessary to accommodate sowing but will also raise each seeding unit into the main frame for transport purposes (end towing, etc.).

In use, the jump stump seeder, comprising a number of seeding units in close array precludes foreign objects inadvertently becoming entangled or jammed between the components. If the splitter bar should become entangled or fouled by an object, the second elongate member shall telescope against the spring and "breakaway" as it does when the seeding unit is in the fully raised position preventing costly damage.

As can be seen from the foregoing, this system further enables a unique and highly versatile variable row function via in line splitter boxes, i.e. (gate valves) which will isolate desired seeding units in the raised position and shutting off relative seed source—example, 3", 6", 9", 12" sowing rows or any combination thereof.

Preferably the configuration of sowing modules will comprise a rigid frame construction, dimensions 15'×4 row×60 seeding units with attachments each end to accommodate additional modules of modulettes and fixed apparatus to accommodate towing—seeding unit spacings will be minimum 3" of staggered configuration (or any desired configuration) to facilitate maximum through flow of trash, rocks, stumps, etc. The main frame is supported by revolving castor wheels on fixed axles to accommodate towing in any direction except backwards. Each castor wheel incorporates its own lifting means wherein the whole main frame seeder can be raised for transport and turning corners, etc.

In operation, the disc depth control adjustment is facilitated by adjusting "depth screws" 8 and raising or lowering dual depth control wheels 7 being constantly engaged by a retaining spring.

The angle of entry of the tynes are adjusted by individual rams on each castor wheel in conjunction with depth stops, always returning to same operating height after lifting machine for transport or turning.

The splitter bar is in itself adjustable within the splitter bar housing by simple removal of two pins and clips to gain further depth control in conjunction with depth control wheels.

The splitter bar incorporates a small section of steel spreader bar wedge 13 welded on each side in a vertical position which in turn consolidated and temporarily widens the split created by coulter. The disturbance created on either side of the furrow by the wedge then falls in on top of deposited seed/super, etc. and serving to improve seed soil contact.

Preferably the splitter is not rigidly connected to the elongate members. It may be mounted in a housing between two flexible compressible rubber grommets, so as to allow compliant movement from side to side as the splitter follows the centre of the initial cut thereby providing even disturbance on both sides of the furrow during flexing or tracking of the coulter disc due to ground conditions or obstacles.

The seeding tube is preferably affixed immediately behind and onto splitter bar.

Figure 5:
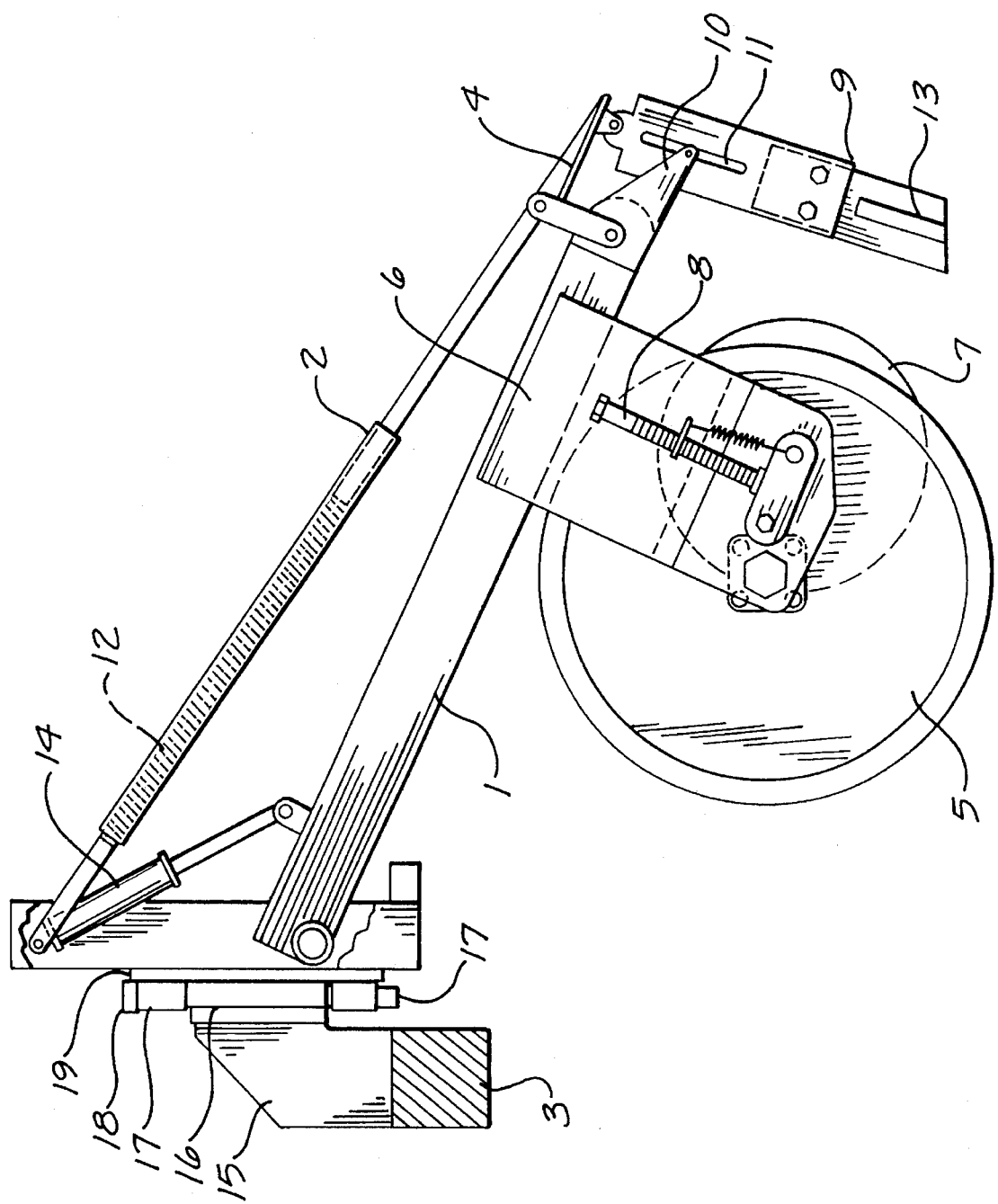
FIG. 5 is a particularly preferred form with a horizontally pivoting seeding unit.

In another aspect, the invention may provide a further improvement whereby the individual seeding units are pivotable in a horizontal plane from the common frame. FIG. 5 gives a representation of this particularly preferred embodiment of the invention where the seeding unit is pivoted by means of hinge comprising a backing plate 19 having two bosses 17 and a receiving boss 16 attached to the common frame 3 via a gusset 15. The bosses 17 and 16 are held together by a removable pin 18 such that it is possible to quickly and efficiently remove a particular seeding unit from the seeder assembly in the minimum of time.

From the foregoing detailed description and preferred embodiments, the versatility and uniqueness of the instant invention is clear.

The particular mechanism allowing adjustment of the splitter in an improved configuration is well adapted to minimise trash blockage. The ability of the seeder to faithfully traverse uneven ground is ensured by the highly flexible mechanism which enhances the performance and power requirements of the seeder.

The concept of direct drilling is not new. However, the concept of a combination variable row seeder with trash clearing staggered row configuration high life stump jump contour following tynes self-adjusting splitter with double acting hydraulic rams on a simple modular frame is unique.

The seeder of the instant invention is capable of direct drilling all types of grass seeds, cereals, oil seeds, etc., into previously unworkable terrain types and conditions (trash, rocks, stumps) on a broadacre basis at a fraction of the cost (initial construction), (maintenance—few wearing parts, easily replaceable), (economics—time/fuel) for the first time.

The entire contents of the provisional specification lodged with Australian Patent Application of which this is the complete specification is hereby imported into this specification and forms part of the disclosure of this specification. The claims form part of the disclosure of this specification.

I claim:

1. A direct drill seeding unit comprising:

a frame;

a splitter operatively connected to the frame;

a contour wheel operatively connected to the frame forward of the splitter, the contour wheel moving vertically up and down in response to changes in ground level; and means for moving the splitter in a counteracting opposite vertical movement to the movement of the contour wheel to maintain the splitter at a substantially constant depth relative to ground level during operation of the direct drill seeding unit.

2. A direct drill seeding unit according to claim 1, further comprising means for changing the orientation of the splitter with respect to the frame in response to vertical movement of the contour wheel to maintain the splitter at a substantially constant angle of entry relative to ground level during operation of the direct drill seeding unit.

3. A direct drill seeding unit according to claim 1, wherein the means for moving the splitter includes a first and second elongate member pivotally connected at a first end to the frame to accommodate vertical movement of the contour wheel and splitter and pivotally connected at a second end to a hinged crank such that relative vertical movement of said first and second elongate members effect a relative vertical, but inverse, movement of part of the hinged crank that in turn affects the counter-acting movement of the splitter.

4. A direct drill seeding unit according to claim 3, wherein the first elongate member has attached thereto said contour wheel adapted to follow the contour of the ground.

5. A direct drill seeding unit according to claim 3, wherein a central portion of the splitter is slidably connected to the second end of the first elongate member, and an end of the splitter is pivotally connected to said hinged crank.

6. A direct drill seeding according to claim 5, wherein the splitter incorporates a seeding tube.

7. A direct drill seeding unit according to claim 3, further comprising means for lowering or raising the seeding unit relative to the ground.

8. A direct drill seeding unit according to claim 3, wherein the second elongate member includes means for shortening the second elongate member to facilitate raising of the seeding unit beyond the normal limits of adjustment of the splitter.

9. A direct drill seeding unit according to claim 8, wherein the second elongate member is capable of compliant compression.

10. A direct drill seeding unit according to claim 3, wherein the second elongate member is resiliently telescopic.

11. A direct drill seeding unit according to claim 10, wherein the resiliently telescopic second elongate member has a coefficient of compression able to resist the normal action of a furrow against the splitter but allows the splitter to retract if an obstacle is struck.

12. A direct drill seeding unit according to claim 7, wherein the means for lowering or raising the seeding unit is a hydraulic means.

13. A direct drill seeding unit according to claim 3, wherein said seeding unit is pivotally connected to a common frame so that the seeding unit can pivot horizontally relative to the common frame.

14. A direct drill seeding unit according to claim 1, further comprising a multitude of independently controlled seeding units.

15. A direct drill seeding unit according to claim 14, wherein the seeding units are spaced transversely in a frame adapted for pulling.

16. A direct drill seeding unit comprising:

a frame;

a contour wheel operatively coupled to the frame, the contour wheel and frame moving vertically up and down in response to changes in ground level during operation of the seeding unit;

a splitter slidably coupled to the frame rearward of the contour wheel, the splitter moving in a counteracting vertical direction to the direction of movement of the contour wheel to maintain the splitter at a substantial constant depth relative to the ground level during operation of the seeding unit; and means for moving the splitter in the counteracting vertical direction to the direction of movement of the contour wheel.

17. The direct drill seeding unit of claim 18, wherein the splitter is also pivotally coupled to the frame and wherein the seeding unit further comprises means for rotating the splitter in response to movement of the contour wheel to maintain the splitter at a constant angle of entry relative to the ground level during operation of the seeding unit.

* * * * *

UNITED STATES PATENT AND TRADEMARK OFFICE
CERTIFICATE OF CORRECTION

PATENT NO. : 5,555,825
DATED : September 17, 1996
INVENTOR(S) : Ian Geddes

It is certified that error appears in the above-indentified patent and that said Letters Patent is hereby corrected as shown below:

Col. 8, line 46, "claim 18," should read --claim 16,--
(Claim 17, line 1)

Signed and Sealed this

Tenth Day of June, 1997

Attest:

BRUCE LEHMAN

*Attesting Officer*　　　*Commissioner of Patents and Trademarks*